Aug. 1, 1950 E. F. BATES 2,516,845

TELEPHONE CALLBOX SYSTEM

Filed Oct. 22, 1946

INVENTOR
ERNEST FREDERICK BATES
BY Robert Harding Jr.
ATTORNEY

Patented Aug. 1, 1950 2,516,845

UNITED STATES PATENT OFFICE 2,516,845

TELEPHONE CALL-BOX SYSTEM

Ernest Frederick Bates, London, England, assignor to International Standard Electric Corporation, New York, N. Y.

Application October 22, 1946, Serial No. 704,959
In Great Britain October 5, 1945

Section 1, Public Law 690, August 8, 1946
Patent expires October 5, 1965

8 Claims. (Cl. 179—5)

This invention relates to telephone sets for use on single wire closed circuit telephone systems e. g. an ambulance call system or a fire alarm system, or a police call system.

The object of the invention is to provide a call box for such a system in which, in spite of a fault in the circuit between the box and the station to be called, calls can be made without special operations on the part of the caller.

One feature of the invention comprises a call-box for a single-wire closed circuit telephone system in which a choice of circuit conditions is provided to suit particular line conditions and in which on the initiation of a call the correct circuit condition is automatically chosen in accordance with the existing line condition.

According to another feature of the invention a call box comprises testing means adapted to test for the existence of a fault, contacts operable on the initiation of a telephone call to render said testing means operative, and further contacts controlled by said testing means and adapted to set up a connection to the called station unaffected by a detected fault.

The invention will be clearly understood from the following description of one embodiment thereof shown in the accompanying drawings, in which.

Figures 1, 1A, 2:
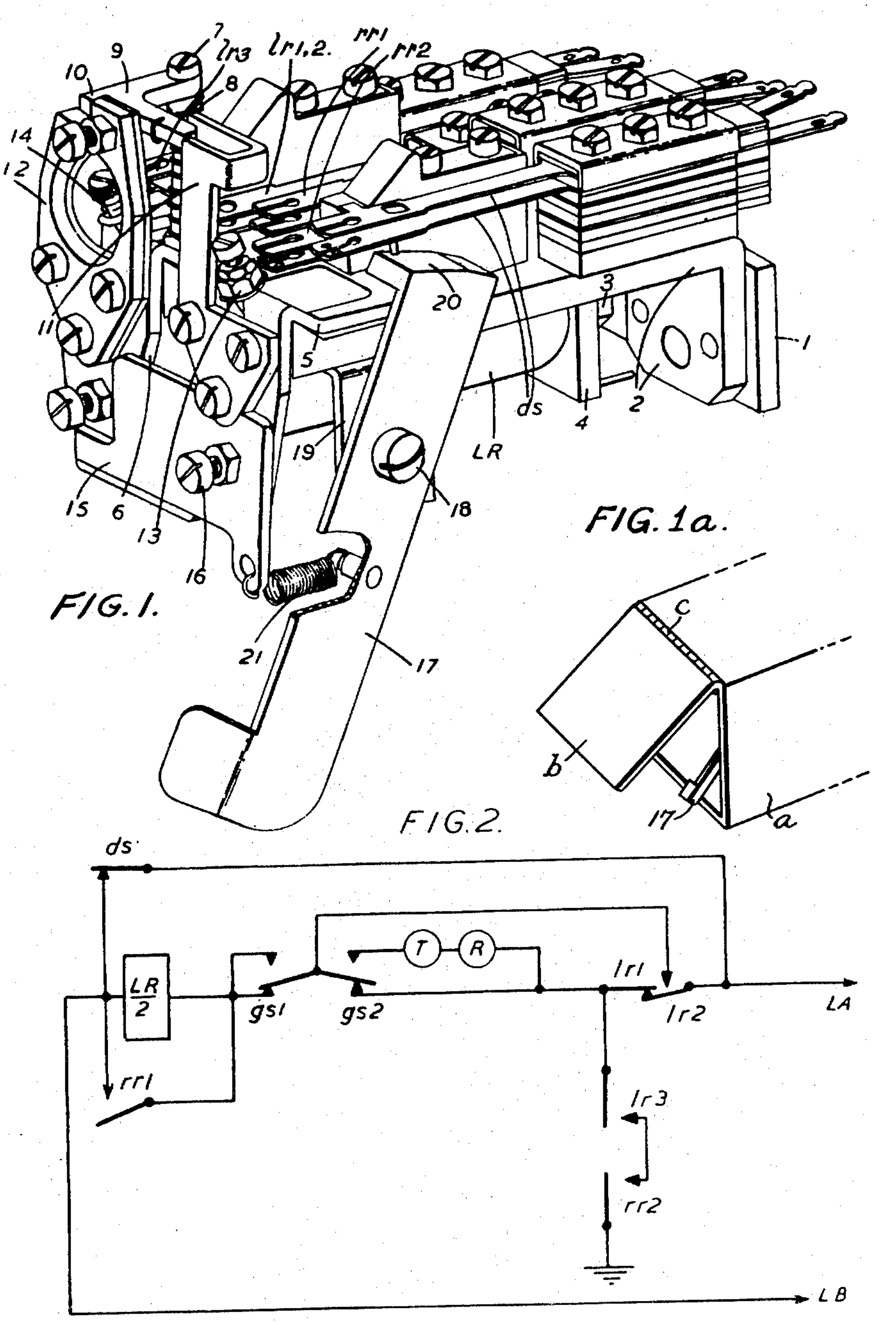
Figure 1 shows the mechanical arrangement of interacting contacts controlled by a latching relay and the door of a call box adapted to form part of a single wire closed circuit telephone system, in particular for an ambulance call box or a fire alarm system.
Figure 1A shows the box for housing the switching mechanism.
Figure 2 shows the circuit arrangement of the call-box.

Referring now to Figure 1, a mounting plate 1 carries two relay-type yokes 2, 3 of standard British post office type, each carrying an armature 5, 6 pivoted thereto by studs 13, 14. A relay coil LR is mounted on the yoke 3, but no coil is provided on yoke 2, the armature 5 of which merely acts as a two-armed lever in a mechanical train to be described, and will hereafter be referred to as a lever.

A vertical stud 7 on yoke 3, carries a latching lever 9 with a latching extension 10. The lever 9 is urged by a spring 8 towards an extension plate 12 fixed to armature 6. An arm 11 fixed to lever 5 is shaped to co-operate with latch 9 and acts as an unlatching device as hereafter described.

A plate 15 fixed to lever 5 by screw 16 extends across armature 6 so that anti-clockwise movement of lever 5 will cause plate 15 to move armature 6 if in unoperated position.

A mounting plate 19 fixed to yoke 2 has pivoted to it at 18 a two-armed lever 17, the lower arm of which is connected to plate 15 by a spring 21, while the upper arm is shaped at 20 to operate contact springs *ds* when the lever 17 rotates anti-clockwise. Contact springs *ds* are mounted on one side of yoke 2 out of range of lever 5, while two pairs of contact springs *rr*1, 2 are mounted on the other side of yoke 2 for operation by lever 5. Two pairs of contact springs *lr*1, 2 are mounted on yoke 3 preferably one on each side for balanced operation by armature 6.

Figure 2 shows the circuit arrangement of the contacts shown in Figure 1, the relay winding LR, together with the microtelephone instruments T, R, and switch-hook contacts *gs*1, *gs*2.

The assembly shown in Figure 1 is mounted in an ambulance box *a* with the lower arm of lever 17 so positioned as to be moved to the right when the door *b* is closed, the door being hinged at *c*. Movement of lever 17 closes springs *ds* and through spring 21 and plate 15 operates lever 5 and armature 6 to operate their respective contacts *rr*1, 2 and *lr*1, 2, 3, Figure 2, to the position shown. The microtelephone is on its cradle with switch hook contacts *gs*1, *gs*2 in the position shown while the box is closed.

When the box door *b* is opened, lever 17 moves clockwise, Figure 1. The first result is that contacts *ds* open, removing a short circuit from relay LR. At this moment a circuit is completed for relay LR; line LA, contacts *lr*1 operated, contacts *gs*2, *gs*1 operated, LR, line LB. Relay LR acts as a test relay for the line condition as described below. After a moment sufficient for LR to operate, decrease of tension in spring 21 allows lever 5 to return to normal. If relay LR has not energised, armature 6 will also return to normal. Release of lever 5 allows its contacts *rr*1, *rr*2 to close a short while after contacts *ds* open.

Further operation depends on condition of line.

*No fault on line*

Relay LR operates momentarily between the opening of contacts *ds* and closure of *rr*1. Latching lever 9 moves to bring its extension 10 in front of arm 12, since it is no longer prevented by arm 11 on lever 5. Contacts *lr*1, 2, 3 therefore remain operated after LR is again short-circuited by contacts *rr*1 and thereby de-energised.

When the microtelephone is removed contacts *gs1*, *gs2* change over, momentarily opening the line (or if desired inserting a resistance). The momentary opening of the line is a signal to the central station that a call is being made. The microphone T and receiver R are then connected in the line via *lr1*, earth being disconnected because contacts *lr3* are still open.

*Earth fault on either side of box*

As in normal operation, LR will momentarily energise when the box is opened but in this case in a circuit between the earth fault and the central station. The box therefore sets up a circuit identical with that formed in the normal case, but the circuit is energised between the earth fault and the central station instead of via the closed loop.

*Open line on either side of box*

There will be no current on the line when contacts *ds* open and in consequence relay LR will not energise so that contacts *lr1*, 2, 3 will return to normal as well as *rr1*, *rr2*.

Earth is now connected via *rr2*, *lr3*, *gs2*, and either *gs1*, *rr1*, and the line LB; or *lr2* and the line LA; to the central station.

When the microtelephone is lifted, contacts *gs1*, *gs2* momentarily open the earthed circuit to signal the central station and finally the gravity switch contacts *gs1*, *gs2* top, connect the telephone set T. R. in the earthed circuit.

*Short circuit in the box*

As in the case of an open line, relay LR will not operate when the box is opened and a circuit is set up from earth via the line, in which the telephone circuit is finally inserted.

What is claimed is:

1. In a single wire closed circuit telephone system, a station connected in said circuit through two lines and including telephone receiver and transmitter units and an associated switch hook, means operable in order to utilize said station for initially automatically testing said lines for ground and open circuit faults, and means effective when at least one of said lines is free from faults and said switch hook is released for automatically connecting said units in the circuit over the latter line.

2. In a single wire closed circuit telephone system, the combination, as set forth in claim 1, in which the initial testing means includes a testing circuit and switch means for placing the latter circuit in operation for a limited period prior to the operation of the connecting means.

3. In a single wire closed circuit telephone system, the combination, as set forth in claim 1, in which the station comprises a call-box which houses said units, testing means, and connecting means, said box including a door, the initial testing means including a test circuit and means including a switch for placing the test circuit in operative condition for a limited period prior to the operation of the connecting means, and means for automatically operating said switch when the door is opened.

4. In a single wire closed circuit telephone system, the combination, as set forth in claim 1 in which the connecting means includes means for connecting said units in series between a grounded line and the other line.

5. In a single wire closed circuit telephone system, the combination, as set forth in claim 1 including a ground connection, said connecting means including means operative when one of said lines is open to connect said units in series between said ground connection and the other line.

6. In a single wire closed circuit telephone system, a station connected in said circuit through two lines, a receiver and transmitter unit at said station, an electromagnet, means operable in order to utilize said station for establishing a circuit between said lines through the electromagnet for a limited period of time, switch means actuated by said electromagnet when energized when said first-mentioned circuit is closed and when one of said lines is grounded, to connect said unit in series with said lines, and actuated when said electromagnet is not energized by reason of the fact that one of said lines is open, to connect said unit in series between the other line and ground.

7. In a single wire closed circuit telephone system, the combination, as set forth in claim 5 in which the electromagnet is normally connected in series with said lines and the electromagnet connecting means includes a bypass circuit which short circuits the electromagnet, a switch in the bypass circuit, and means for opening and then closing said switch.

8. In a single wire closed circuit telephone system, the combination, as set forth in claim 5, in which the connecting means includes an armature for the electromagnet, a switch connecting said unit to one of the lines, means for closing said switch when said armature is shifted by the electromagnet, and latch means for retaining the switch in closed position after the magnet is deenergized.

ERNEST FREDERICK BATES.

REFERENCES CITED

The following references are of record in the file of this patent:

UNITED STATES PATENTS

| Number | Name | Date |
|---|---|---|
| 105,552 | Cushman | July 19, 1870 |
| 450,466 | Ludlow | Apr. 14, 1891 |
| 543,104 | Rolfe | July 23, 1895 |
| 848,636 | Condon | Apr. 2, 1907 |
| 2,074,172 | Glen | Mar. 16, 1937 |
| 2,137,302 | Begun | Nov. 22, 1938 |